US011503132B2

(12) United States Patent
Assadipour et al.

(10) Patent No.: US 11,503,132 B2
(45) Date of Patent: *Nov. 15, 2022

(54) SYSTEM AND METHOD FOR SCALABLY TRACKING MEDIA PLAYBACK USING BLOCKCHAIN

(71) Applicant: Beatdapp Software Inc., Vancouver (CA)

(72) Inventors: Pouria Assadipour, Burnaby (CA); Andrew Batey, Vancouver (CA)

(73) Assignee: Beatdapp Software Inc., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/119,612

(22) Filed: Dec. 11, 2020

(65) Prior Publication Data

US 2021/0099534 A1 Apr. 1, 2021

Related U.S. Application Data

(63) Continuation of application No. 16/586,876, filed on Sep. 27, 2019, now Pat. No. 10,972,560, which is a continuation of application No. 16/457,663, filed on Jun. 28, 2019, now Pat. No. 10,469,605.

(51) Int. Cl.
*H04L 67/50* (2022.01)
*H04L 67/1097* (2022.01)
*H04L 65/612* (2022.01)

(52) U.S. Cl.
CPC .......... *H04L 67/535* (2022.05); *H04L 65/612* (2022.05); *H04L 67/1097* (2013.01)

(58) Field of Classification Search
CPC .. H04L 67/22; H04L 65/4084; H04L 67/1097
See application file for complete search history.

(56) References Cited

U.S. PATENT DOCUMENTS

| | | | |
|---|---|---|---|
| 10,250,390 B1* | 4/2019 | Gray | H04L 63/1466 |
| 2009/0150918 A1* | 6/2009 | Wu | H04H 60/66 |
| | | | 725/9 |
| 2015/0095646 A1* | 4/2015 | Nair | G06F 21/10 |
| | | | 713/168 |
| 2017/0116693 A1* | 4/2017 | Rae | G06Q 20/3827 |
| 2017/0147830 A1* | 5/2017 | Park | G06F 21/10 |
| 2018/0352268 A1* | 12/2018 | O'Hanlon | H04L 67/104 |
| 2019/0020480 A1* | 1/2019 | Camenisch | H04L 9/3263 |
| 2019/0279257 A1* | 9/2019 | Kokernak | G06Q 30/0277 |
| 2019/0318060 A1* | 10/2019 | Brenner | H04N 21/233 |
| 2020/0234682 A1* | 7/2020 | Alston | G06F 16/1827 |

* cited by examiner

*Primary Examiner* — Viet D Vu
(74) *Attorney, Agent, or Firm* — Kwan & Olynick LLP

(57) ABSTRACT

Systems and methods for tracking media file playback are provided. A request to upload a media file and metadata associated with the media file is received. Next, the media file and metadata is uploaded via a blockchain protocol. Next, a request to play the media file is received from a client device or a digital service provider (DSP) platform. The request to play the media file is validated via the blockchain protocol. Upon validating the request to play the media file, the media file is transmitted for playback at the client device or DSP platform. Last, the number of times the media file is played is tracked via the blockchain protocol.

20 Claims, 12 Drawing Sheets

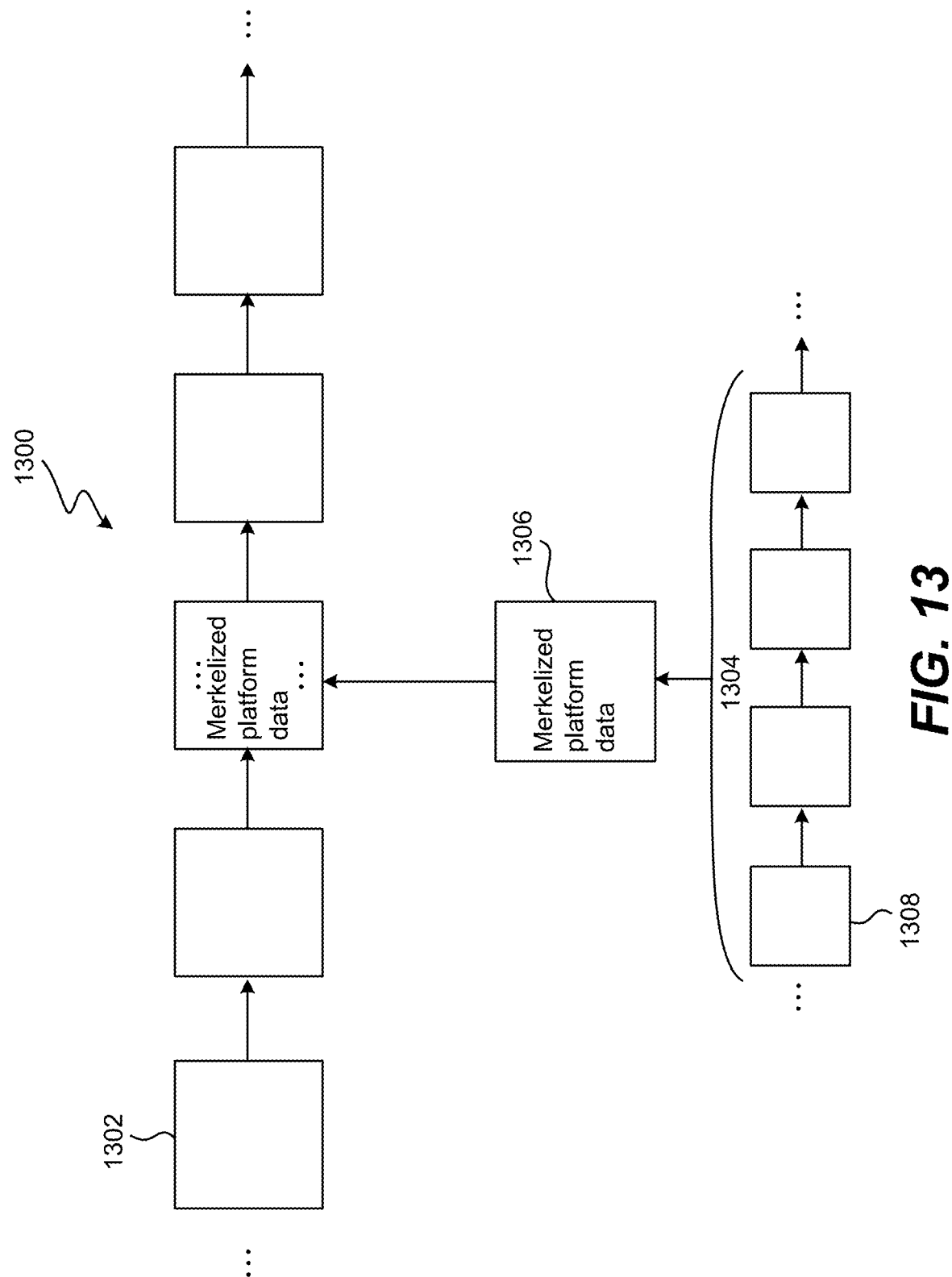

SYSTEM AND METHOD FOR SCALABLY TRACKING MEDIA PLAYBACK USING BLOCKCHAIN

CROSS-REFERENCE TO RELATED APPLICATIONS

This application is a continuation of U.S. patent application Ser. No. 16/586,876 by Batey et al., filed on Sep. 27, 2019, titled SYSTEM AND METHOD FOR SCALABLY TRACKING MEDIA PLAYBACK USING BLOCK-CHAIN, which is a continuation of U.S. patent application Ser. No. 16/457,663 by Batey et al., filed on Jun. 28, 2019 titled SYSTEM AND METHOD FOR SCALABLY TRACKING MEDIA PLAYBACK USING BLOCK-CHAIN, which is incorporated by reference herein in its entirety and for all purposes.

TECHNICAL FIELD

The present disclosure relates to digital media, and specifically to tracking streaming media.

BACKGROUND

The music industry generates an estimated $25 billion in revenue based on royalties. With the advent of the Internet, streaming technology makes it easy for listeners to listen to almost any song of their choosing. Artists usually work with music labels to distribute media and to help collect revenue based on royalties. These music labels distribute media through a variety of different mediums, including streaming platforms or digital service providers (DSPs), such as Spotify or Apple.

Although access to songs has been facilitated by DSPs, keeping track of all songs streamed or the amount of playback of certain songs has become an increasingly difficult problem to solve. Thus, as much as 25% of the activity on streaming platforms today is unlicensed. In addition, even for the licensed activity, up to 15% of total royalties remain uncollected annually. The DSPs claim that they lack the necessary data and technology to help figure out whose claims were legitimate, or even how to locate certain parties. In addition, the lack of an authoritative database that covers all existing music rights only adds to the problem. Thus, there is a need for a reliable content identification technology that allows anyone to register, identify, and track creative works on the Internet.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

Aspects of the present disclosure relate to a system and method for tracking media file playback using blockchain. First, a request to upload a media file and metadata associated with the media file is received. Next, the media file and metadata are uploaded via a blockchain protocol. Next, a request to play the media file is received from a digital service provider (DSP) platform or one of their end users' devices. The request to play the media file is validated via the blockchain protocol. Upon validating the request to play the media file, the media file is transmitted for playback at the client device or DSP platform. Last, the interactions with the media file are tracked via the blockchain protocol.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The disclosure may best be understood by reference to the following description taken in conjunction with the accompanying drawings, which illustrate particular embodiments of the present disclosure. In the description that follows, like parts are marked throughout the specification and drawings with the same numerals, respectively. The drawing figures are not necessarily drawn to scale and certain figures may be shown in exaggerated or generalized form in the interest of clarity and conciseness.

FIG. 13 shows an example of merkelizing of a portion of a platform data set, in accordance with embodiments of the present disclosure.

DETAILED DESCRIPTION

Figure 1:
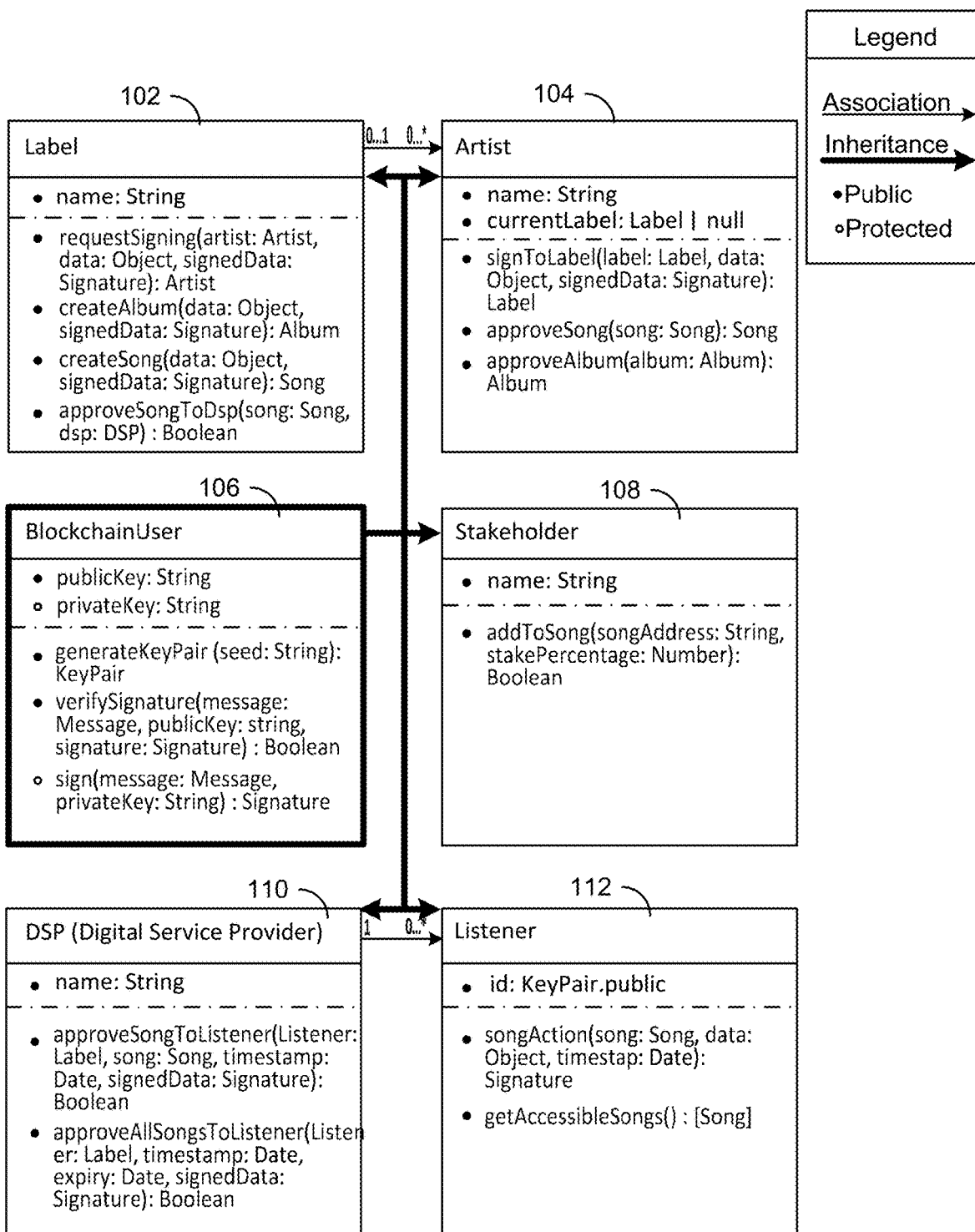
FIG. 1 shows an example diagram of available user types' relationships, data, and functions in disclosed systems, in accordance with embodiments of the present disclosure.

Reference will now be made in detail to some specific examples of the disclosure including the best modes contemplated by the inventors for carrying out the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

For example, the techniques of the present disclosure will be described in the context of media file transmissions, cryptography, data storage, and media access validation. However, it should be noted that the techniques of the present disclosure apply to a wide variety of network transactions, collaborative environments, data structures, and different types of data. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

As used herein, the term "platform" will refer to the platform systems and methods disclosed herein. Throughout the disclosure, the terms "platform" and "system" are used interchangeably. According to various embodiments, a blockchain music platform is provided. In some embodiments, a blockchain is defined as a decentralized, secure, and unalterable digital ledger or database that keeps a permanent record of all transactions. In some embodiments, on a blockchain ledger are "smart contracts," which lay out the terms and costs of blockchain transactions. In some embodiments, the smart contracts can be amended, but all previous versions remain on the blockchain. Because of the complete history of transactions and changes to smart contracts, blockchain technology is inherently more transparent and secure than current systems of closed contracts and databases.

In some embodiments, the blockchain music platform allows users to upload media files, e.g., songs, along with metadata associated with the media files, to the server or database. In some embodiments, once a request to upload a song is received, a blockchain transaction is created for the song and saved to the blockchain. In some embodiments, data such as song details, content access details, and stakeholders' stakes, as well as hundreds of other potential metadata fields, are also saved to the blockchain. In some embodiments, to ensure that data is immutable and the network is secure, transactions on the blockchain need to be validated before being finalized. In some embodiments, validation occurs only after at least 2 or more transaction validators (sealers), or authorized/trusted validation nodes, can validate the transactions.

In some embodiments, because the data storage needs are great in order to practically support media streaming for a large plurality of users, the system will not use token. However, in other embodiments, tokens can be created and used for payment processing.

In some embodiments, transactions are validated using a Proof of Authority (PoA) consensus algorithm. In other embodiments, transactions are validated using a Proof of Work (PoW) algorithm. However, according to various embodiments, PoA works better for the systems and methods disclosed for the following reasons. First, in PoA, only certain parties are allowed to validate transactions on the blockchain. Since the nodes that are allowed to seal blocks or validate transactions and identify which party they belong to are predefined, then the time needed for validation can be decreased. Second, transactions in PoA can be finalized as soon as they are processed by the blockchain, since any authorized sealer can cryptographically validate transactions. Consequently, blocks can be appended to the blockchain in any order as long as they are valid. Thus, another consequence of the PoA is that "uncle blocks" or "orphan blocks" are eliminated, since valid blocks do not get rejected simply due to the mechanism of the blockchain. Third, transaction throughput for PoA implementations are only limited by the hardware they run on. Thus, the systems disclosed can accommodate for millions of transactions per second. By contrast, for PoW implementations, the transaction throughput is mostly limited by the difficulty of the required proof of work in the protocol. Last, PoA is not susceptible to Sybil attacks since the identities of the nodes are known.

In some embodiments, the PoA consensus algorithm uses the following formula to decide which nodes are allowed to seal the next block:

$$(\text{Number of consecutive blocks minded per sealer}) = (\text{floor}(\text{Number of Sealers}/2)+1)$$

In other embodiments, the transaction will be validated and sealed by the first two available sealers in order to ensure prompt availability of content. In some embodiments, block proposals will not be used. In such embodiments, once a song or media file is requested by a client device, a short buffer of the song or media file is instantly transmitted or streamed. However, the full song or media file will not be piped to the client device until the transaction is finalized on the blockchain, usually within less than a second later. In some embodiments, the playback of a media file is not accounted for until a predetermined amount of the content has been played by the end user. Thus, in cases where an end-user does not consume the content for the predetermined length of time, the initialization of the play may have occurred and some content may be streamed to the end-user, however since they did not consume the content for long enough, the play event will not be sent to the blockchain.

According to various embodiments, billions of transactions can be made to the blockchain every hour. Consequently, a large amount of data may be stored on the blockchain. Thus, it may become impractical to control storage costs if every node needed to have a full history of the blockchain. Thus, in some embodiments, various different compatible versions of the blockchain client are created. In such embodiments, "lighter" clients will have the same functionality as the regular blockchain client. However, these clients do not need to contain all of the past blockchain history in order to do certain tasks such as validating transactions. Thus, in some embodiments, light clients do not need to download a portion of the blockchain history. In some embodiments, sealers only need download the latest block's header that was sealed in order to start validating transactions. In some embodiments, sealers are only tasked with validating cryptographic signatures and do not need any history of the blockchain's events. For "heavier" clients, data on the blockchain are pruned by using block headers as references. In some embodiments, lighter clients can use a Merkle Tree to hash data and store the root to reduce the required storage space. However, in some embodiments, parties have the option of running full nodes to have copies of the entire blockchain. In some embodiments, parties can choose whether to keep blockchain data directly on the node or to offload the data into a separate storage solution.

According to various embodiments, different parties involved with the platform will need different digital infrastructures. For example, DSPs and Music Labels may want to participate in securing the network using the platform's consensus protocol. However, different parties are free to make their own blockchain clients as long as they follow the platform's consensus protocol specifications.

In some embodiments, a node can be run by a single computer. In some embodiments, a node can be run across an array of computers. Some architecture choices for running a node can include using load balancers or serverless technologies. The main requirement for each node is that it needs to represent one identity, perhaps by being represented by one or many public keys registered against the participant's identity.

In some embodiments, servers of the platform provide more services than just being a participant in the network. In some embodiments, the servers are responsible for serving digital media content directly to listeners via a content delivery network (CDN). In such embodiments, the platform will use the anycast methodology with nginx for a distributed set of content servers. In such embodiments, each time a file is served, it is also fingerprinted with the transaction hash or other identifying information.

In some embodiments, DSPs will be required to change their client side applications. For example, DSPs likely have a separate endpoint for each song on their platform. Thus, DSPs will need to change the endpoints currently serving the file to one that will make a request to the blockchain network. Once the request is validated, the full song file will be piped to the user by the CDN.

In some embodiments, in order to cryptographically verify that a user has made a certain action, the blockchain protocol leverages elliptical curve digital signature algorithms (ECDSA). In such embodiments, end-users need to create a signature every time a request is sent. Thus, DSPs must supply their listeners (either on the client's device or using the DSP's own server) with a cryptographic keypair.

According to various embodiments, due to the large amount of transactions per second handled by DSPs, several methods for scaling are provided. In some embodiments, a consortium blockchain is implemented instead of a public blockchain. When building the consortium blockchain, PoA is used. By staking their identity/reputation, transaction validators are able to quickly approve requests and are only constrained by their own hardware and internet infrastructure.

In some embodiments, it is not feasible to use a single blockchain to record transactions occurring across the network. In some embodiments, the blockchain can be partitioned into geographic shards. For example, one shard could be responsible for North America while another is responsible for London. In some embodiments, including other embodiments noted in the present disclosure, the blockchain can be partitioned by Label and DSP relationship. For example, a shard can be between StreamCo and Label A while StreamCo has another shard with Label B. In such embodiments of relationship sharding, the participants cannot access data from a relationship that they do not belong to.

In some embodiments, each participant in the blockchain network is required to run a minimum number of nodes spread across the globe. Thus, the platform's bootnodes will geographically group sealers using a routing algorithm. In some embodiments, once a shard is spawned from the main chain, it is periodically merklized and the root hash is taken and stored on the main chain. Periodically, or once the shard is closed, the history of it is added to the main chain. In some embodiments, in the unlikely case of a dispute in a shard, the most recent cryptographically provable data will be used as the truth. In some embodiments, end users are assigned and unassigned from geographic shards by requests made on the main or DSP-Label relationship shards. In some embodiments, once a user is assigned to a certain shard, they cannot make requests in another shard within the same DSP-Label relationship shard.

In some embodiments, off-chain scaling can be incorporated into the protocol. For example, state channels, child chains, or sharding chains can all be used in the consensus protocol. The following example illustrates one method for incorporating off-chain scaling. In the example, the platform's sharding implementation uses a main chain transaction to open a relationship. As a note, every media play is counted instead of just the final outcome of the state channel.

Example: Alice opens up her music application to play music from a DSP. She is assigned to the appropriate geographic shards for her DSP (either existing or newly created if resources are available). Alice can now stream any amount of media content without stressing the main chain. Each stream request is signed by Alice using her private key and can be verified by any sealing node by using her public key.

Looking at the following use case of her music application one of ordinary skill in the art can see how sharding improves performance: Alice requests to play a song by cryptographically signing a request. The request is verified by at least two sealers before the platform CDN streams music to Alice. The call to the song's address will be recorded to the shard's blockchain. The difference between this method and a conventional call to the blockchain is that the requests won't be committed to the main chain right away. At arbitrary intervals in the song's runtime, a request is automatically made from the client within the shard to get the next part of the song the user is listening to. Data will be piped in chunks to keep track of playback data. If at any point there's a transaction that wasn't signed by Alice or there's a dispute on the number of songs that she played, the most recent cryptographically provable data is committed to the main chain. Then the shard continues or closes and the main chain reassigns all the active users in the shard. If Alice hasn't listened to any music for an arbitrarily set amount of time (as defined when she joined the shard), then she is unassigned from all shards.

In some embodiments, every song streamed from one of the platform's CDNs will be stamped allowing the original streamer of the content to be identified. In some embodiments, the entire fingerprinting process is broken up into two main components: stamping (applying the fingerprint to the track) and scraping (finding tracks that were originally played from the platform's CDNs and identifying how the content leaked). In some embodiments, the fingerprinting method must remain secret in order to ensure bad actors don't try to remove or distort their identifying fingerprint.

In some embodiments, by stamping files using digital steganography, minimal user data can be hidden within the data that is being sent to the user. Each time a song is streamed or downloaded, a hidden "watermark" can be written to the file. Using digital signal processing, an algorithm can write or identify parts of digital content that are common to every file of that format. For example, every mp3 file will have a point in the song that is a lower pitch than all the other portions of the song. At the common point of the song, an encrypted digital fingerprint of the user can be added.

In some embodiments, stamp recognition software will extract digital fingerprints by using digital signal processing to deconvolute the original file uploaded from the file that was scraped from the web. If a digital fingerprint is found, it can be decrypted and traced back to a user and time of play. In some embodiments, scraping for fingerprinted content can be broken down into 3 major steps: 1) Build a web crawler for common pirating/streaming sites. 2) Extract and cache audio files. This step requires a custom solution for scraping for each streaming/download site. 3) Run cached audio against the stamp recognition software.

According to various embodiments, the systems and methods disclosed allow for verification of catalog, ownership, and payment details for media files. In some embodiments, the systems also allow for accruing and accounting of payments. In some embodiments, the systems also allow for depositing the correct amounts in the correct accounts. In some embodiments, the systems provide for equitable, transparent, auditable, and near-real-time payment for creators of musical works and sound recordings (artists), labels, and distribution platforms. In addition, in some embodiments, the systems provide real-time compliance and auditing mechanisms.

FIG. 1 shows an example diagram of some available user types' relationships, data, and functions in disclosed systems, in accordance with embodiments of the present disclosure. In some embodiments, based on a user's role, they will have different responsibilities on the disclosed platform. In FIG. 1, every user 106 is able to make their own cryptographic key pair for signing data and verifying signatures against given data and public keys.

In some embodiments, labels 102 are in charge of uploading songs and album metadata to the platform. In some embodiments, labels can additionally approve songs in their catalog to be distributed by DSPs. In some embodiments, label administrators prepare a song or album for the platform by filling in the required metadata, uploading the song file, and assigning stakeholder shares. Upon receiving a valid upload request from a label account, an entry is broadcasted to the blockchain. In response to an artist being credited to a song, the artist now has the option to approve the song, which will make it available to the DSP on the song's release date.

In some embodiments, the uploaded song is held on a media server and can only be accessed by users who have made a cryptographically valid request to the blockchain to access the content. In some embodiments, the administrator can use the platform web product to view analytical data about song playbacks. In some embodiments, the administrator can break down data by each request, allowing them to track how users are engaging with their content.

In some embodiments, once an artist 104 gets a contract offer with a label 102, artist 104 can accept being added to the label 102. In some embodiments, artist 104 may not be assigned to a label. In such embodiments, artist 104 is able to act as their own label on the platform. When a label 102 uploads a song, it is unconfirmed until the credited artist 104 approves the upload. Artists 104 are allowed to view their own song playback data via the platform but are restricted from viewing any of their colleagues' data.

In some embodiments, stakeholders 108 for each song are determined before getting finalized on the blockchain. In some embodiments, a percentage of revenue of each song is assigned to stakeholders 108. In some embodiments, stakeholders 108 are able to view data on songs which they own part of.

In some embodiments, thanks to DSPs 110, end-users 106 are given access to songs. Since most DSPs 110 use a subscription model there's functionality to allow a user 106 to listen to any song on the DSP's platform for a set time period. In some embodiments, the suggested changes that existing DSPs will need to make to their systems in order to leverage the platform's technology are minor.

In some embodiments, users 112 of a DSP's application should not perceive any difference when streaming songs. Instead, the DSP 110 that created the end user is in charge of managing the user's key. Whether the DSP wants to sign requests using their own servers or their client applications is up to the DSP.

Figure 2:
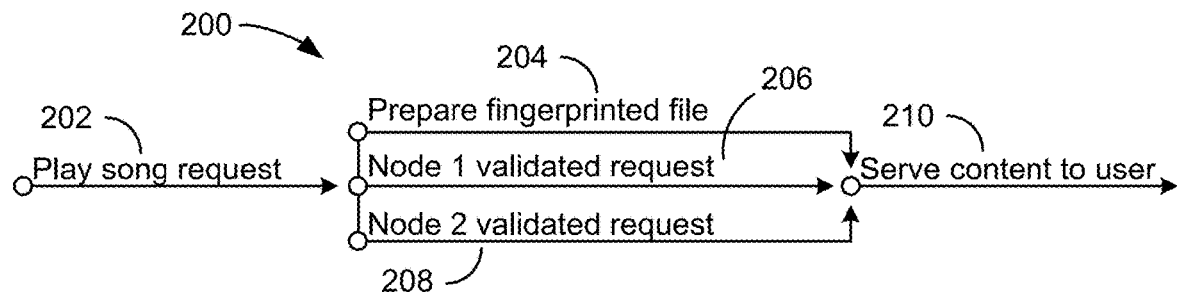
FIG. 2 illustrates an example latency analysis from a song play request to serving fingerprinted content, in accordance with embodiments of the present disclosure.

In some embodiments, latency issues arise when nodes are not sufficiently close, meaning the latency between two nodes goes up as the distance between them increases. By leveraging geographic sharding of the child chains, signal travel time will be reduced. FIG. 2 will help explore latency on the blockchain network. FIG. 2 illustrates an example latency analysis from a song play request to serving fingerprinted content, in accordance with embodiments of the present disclosure. The latency 200 can be broken down into steps, some of which run in parallel.

At 202, a song is requested for play. In some embodiments, when an end user plays a song, the request is transmitted to 2 main places: the blockchain shard assigned to the user and the CDN. At 204, the fingerprinted file is prepared. Steps 206 and 208 deal with sealing the request. In some embodiments, the first 2 out of 3 distinct parties to validate the request will signal that the transaction is sealed. At 206, the request is validated by the first node. At 208, the request is validated by the second node. Not visualised here is a third node that is slower than the other two nodes, 206 and 208, at validating the incoming play request. This slower node can still have its cryptographic signature attached to the play event eventually, however it is not required to seal this play request. At 210, content is served to the user. In some embodiments, the server pipes the digital media file to the user. As a result of the path outlined in FIG. 2, the following equation for a successful file response can be written:

$$t_{latency} = \max(t_{client,CDN}, t_{client,Node\ 1}, t_{client,Node\ 2}) + \max(t_{prep\_file} + t_{Node\ 1,CDN}, t_{Node\ 2,CDN}) + t_{serve\_file}$$

In some embodiments, privacy of data is important. According to various embodiments, there are two ways for DSPs and labels to ensure that their competitors are not able to view their analytical data: 1) multi-layered sharding and 2) zero knowledge proofs.

Figure 3:
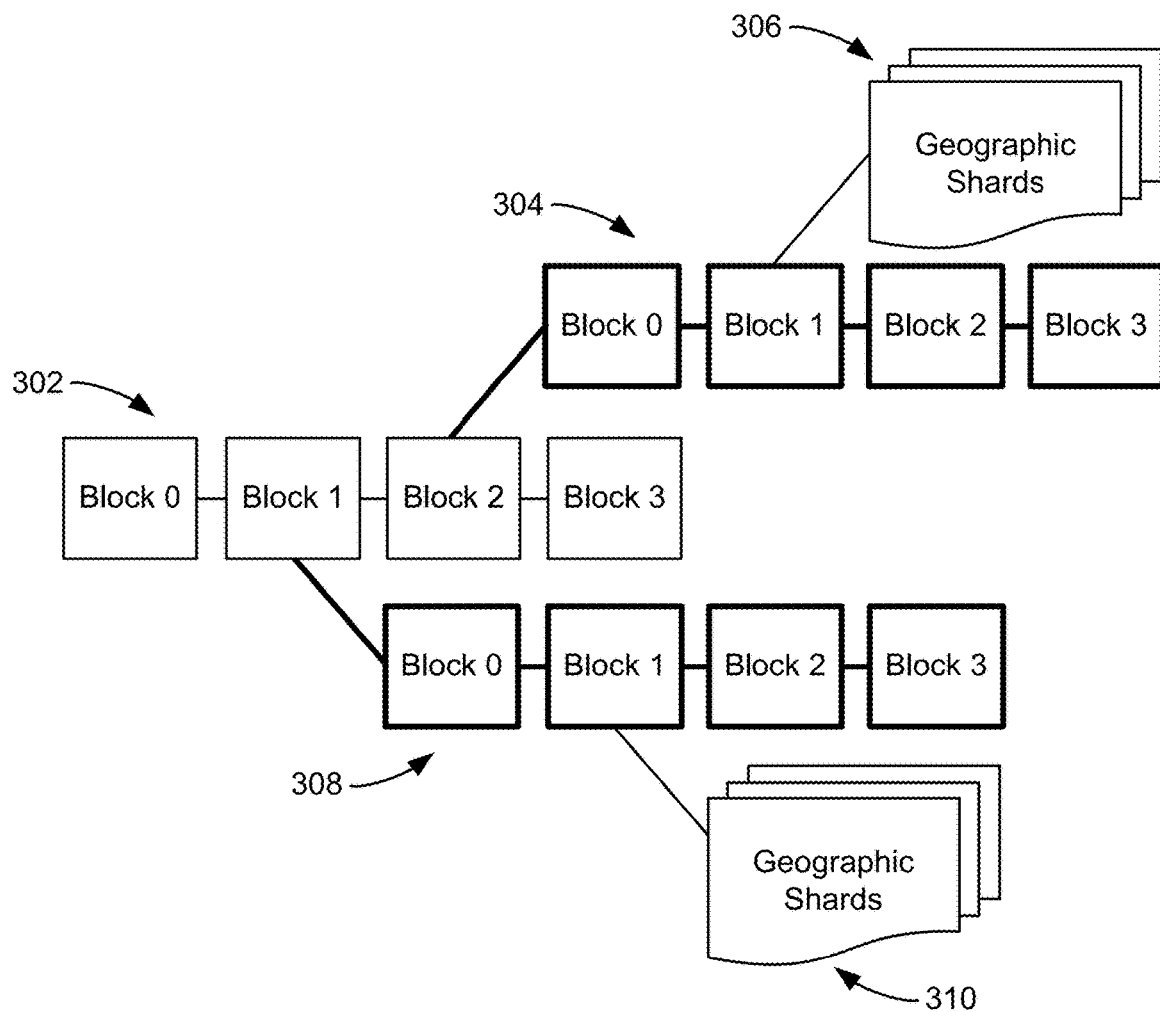
FIG. 3 illustrates an example diagram of sharding, in accordance with embodiments of the present disclosure.

FIG. 3 illustrates an example diagram of multi-layered sharding, in accordance with embodiments of the present disclosure. FIG. 3 illustrates main chain 302, relationship shards 304 and 308, as well as geographic shards 306 and 310. In some embodiments, each Label-DSP relationship is grouped into its own shard 304 or 308.

In some embodiments, zero knowledge proofs are also used to ensure data privacy. With zero knowledge proofs, network participants can cryptographically validate a transaction without revealing the data in the transaction. In some embodiments, any data written to the chain should use one-way encryption. This keeps any data on the chain as only readable by the parties who have the key to decrypt the data. In some embodiments, the decryption key on each relationship shard will be shared between the DSP and Label.

In some embodiments, while having the platform own the servers for the CDN requires the least trust between labels and DSPs, there are alternative tracking methods available. For example, the platform can create a software development kit (SDK) or library to run with the DSPs' applications. In such an example, the primary purpose of the SDK is to provide the DSP with the right cryptography algorithms used to sign and verify transactions. In some embodiments, the DSP will be required to provide a report at regular intervals or by certain triggers, with playback event data and their associated signatures. In some embodiments, the platform will arrange an auditing system where the system creates end-user accounts on the streaming platform and ensures that the plays are being counted according to the protocol. In some embodiments, the benefits of using the SDK include the fact that the DSPs will be happy they can hold onto the content. In some embodiments, the drawbacks of this method include the fact that the DSPs still control the content on their servers and that Labels can only verify figures by doing a covert audit of the DSP. In some embodiments, the platform will have to write an implementation of the plugin for each of the DSPs' interfaces (web, mobile app, desktop app).

In some embodiments, another alternative tracking method involves encrypted codecs. In such embodiments the platform can create a custom file type to encrypt a file every time it is accessed. In some embodiments, the DSPs can then hold the encrypted files on their own servers. This encryption method could take in a signed request by the user in order to decrypt the file. In some embodiments, the benefits of this method include the fact that offline interactions can be trustlessly taken into account with this method. In some embodiments, another benefit is the possibility of covertly stamping the user's data to the file in the decryption step. In some embodiments, yet another benefit includes the fact that DSPs are happy they can hold onto the content. In some embodiments, the drawbacks of this method include the fact that it requires talent to research and implement a new standard. In some embodiments, another drawback includes the fact that there is still a vector to steal the contents of the file by accessing the device's cache on which the content is being played. In some embodiments, yet another drawback is that fact that DSPs have to implement the codec standards the platform puts forward.

FIGS. 4-10 are illustrated to provide more context to the music industry and the role that the platform (and the disclosed systems and methods) plays in licensing and streaming music.

Figure 4:
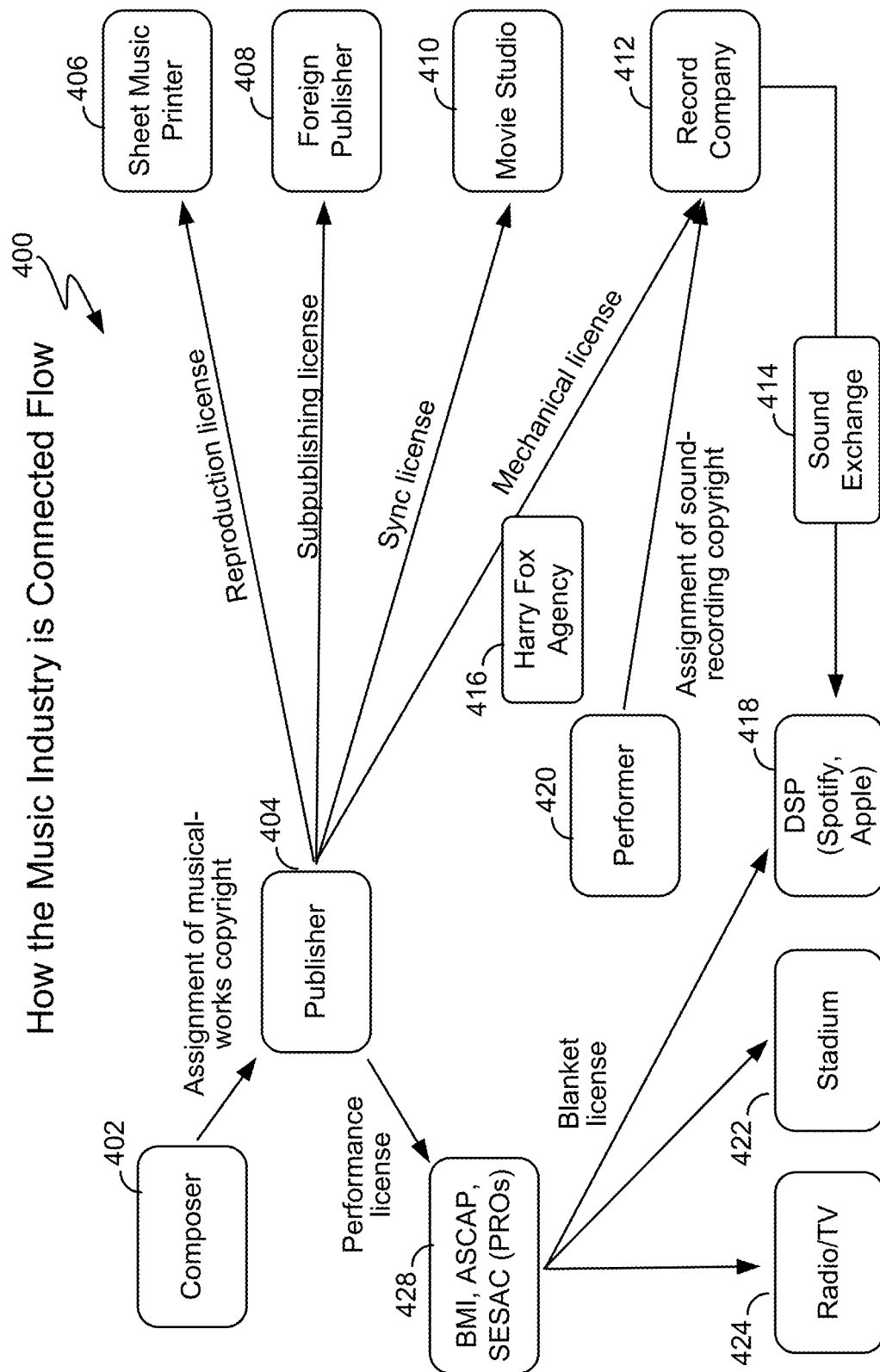
FIG. 4 shows a diagram of one example of how the music industry is connected, in accordance with embodiments of the present disclosure.

FIG. 4 shows a diagram 400 of one example of how the music industry is connected, in accordance with embodiments of the present disclosure. In FIG. 4, composers 402 assign musical works copyright to publisher 404. Next publisher 404 grants a performance license to performance rights organizations (PROs) 428. PROs 428 then issues blanket licenses to Radio/TV 424, Stadiums 422, and DSPs 418. Going back to publisher 404, publisher 404 also gives reproduction licenses to sheet music printers 406, subpublishing licenses to foreign publishers 408, sync licenses to movie studios 410, as well as mechanical licenses to record companies 412. In some embodiments, the mechanical licenses go through the Harry Fox Agency 416. Record companies 412 are also assigned sound recording copyrights from performers 420 and then subsequently provide sound exchange 414 with DSPS 418.

Figure 5:
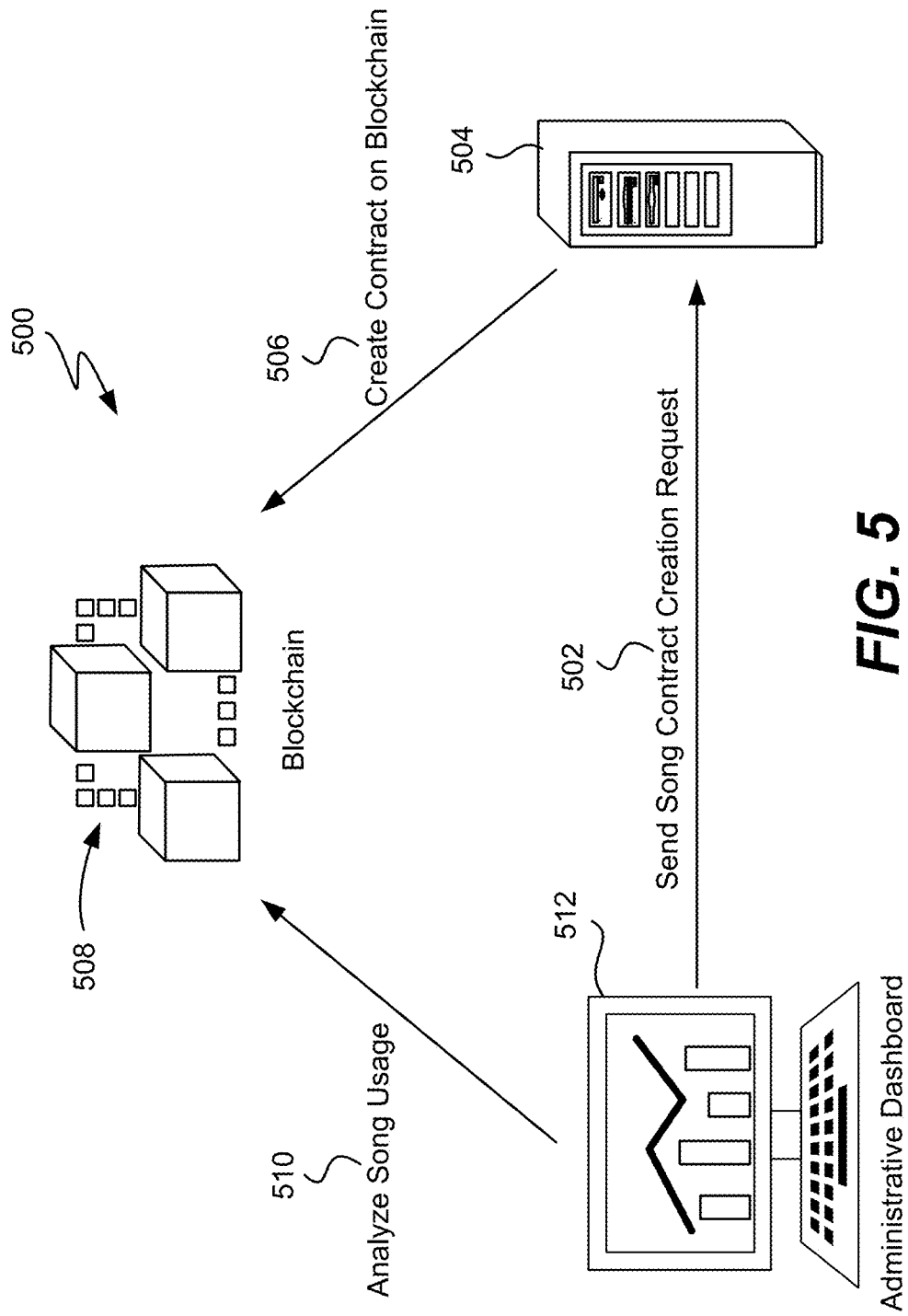
FIG. 5 shows a diagram of one example of the role of a basic administrator, in accordance with embodiments of the present disclosure.

FIG. 5 shows a diagram 500 of one example of the role of a basic administrator, in accordance with embodiments of the present disclosure. First, administrative dashboard 512 sends a song creation request 502 to server 504. Next, server 504 creates a contract 506 on blockchain 508. Last, administrative dashboard 512 analyzes song usage 510 at the blockchain.

Figure 6:
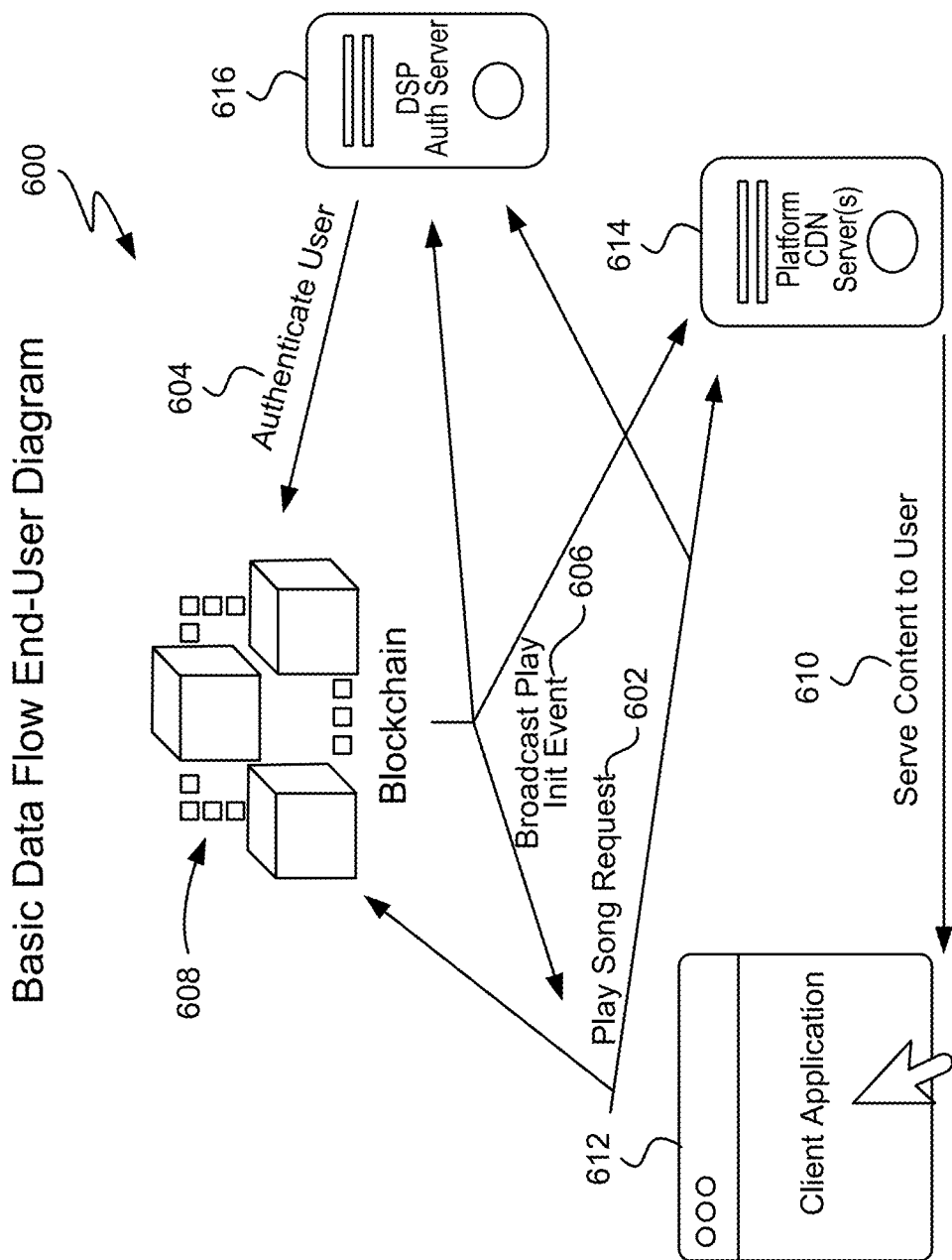
FIG. 6 shows a diagram of one example of a basic data flow of an end-user, in accordance with embodiments of the present disclosure.

FIG. 6 shows a diagram 600 of one example of a basic data flow of an end-user, in accordance with embodiments of the present disclosure. Diagram 600 begins with client application 612 sending a play song request 602 to platform CDN server 614, blockchain 608, and DSP authentication server 616. Next, DSP authentication server 616 communicates 604 to the blockchain network 608 that the user is indeed allowed to access the specified resource. Next, blockchain 608 broadcasts that the play is ready to be initialized by the CDN 614 to the client application 612. Last, platform CDN server 614 serves the content to the user 610.

Figure 7:
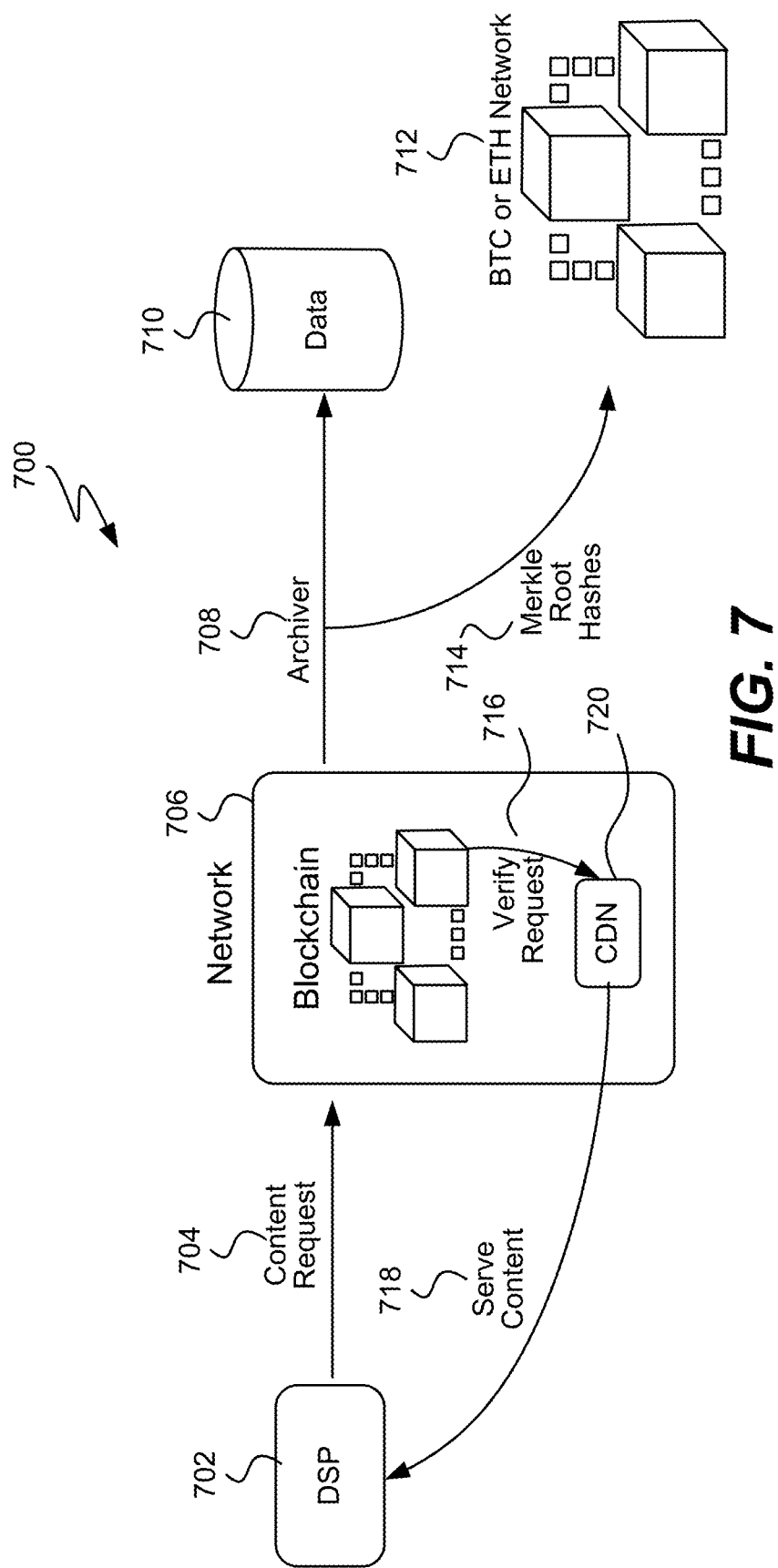
FIG. 7 shows a diagram of one example of a media file playback tracking network, in accordance with embodiments of the present disclosure.

FIG. 7 shows a diagram 700 of one example of a media file playback tracking network, in accordance with embodiments of the present disclosure. DSP 702 transmits a content request 704 to blockchain network 706. Blockchain network 706 then verifies the request 716. After the request is verified and considered sealed, CDN 720 serves content 718 to the DSP 702 or to the DSP's end-user who made the original playback request. Transactions that are validated are archived 708 for later inspection or audit into a data storage solution 710. Periodically or upon certain events, a segment of the blockchain data is distilled down to its merkle root hash 714 and that root hash is written to a third party blockchain network 712. The mechanism for writing to an external blockchain is further explored in FIG. 13.

Figure 8:
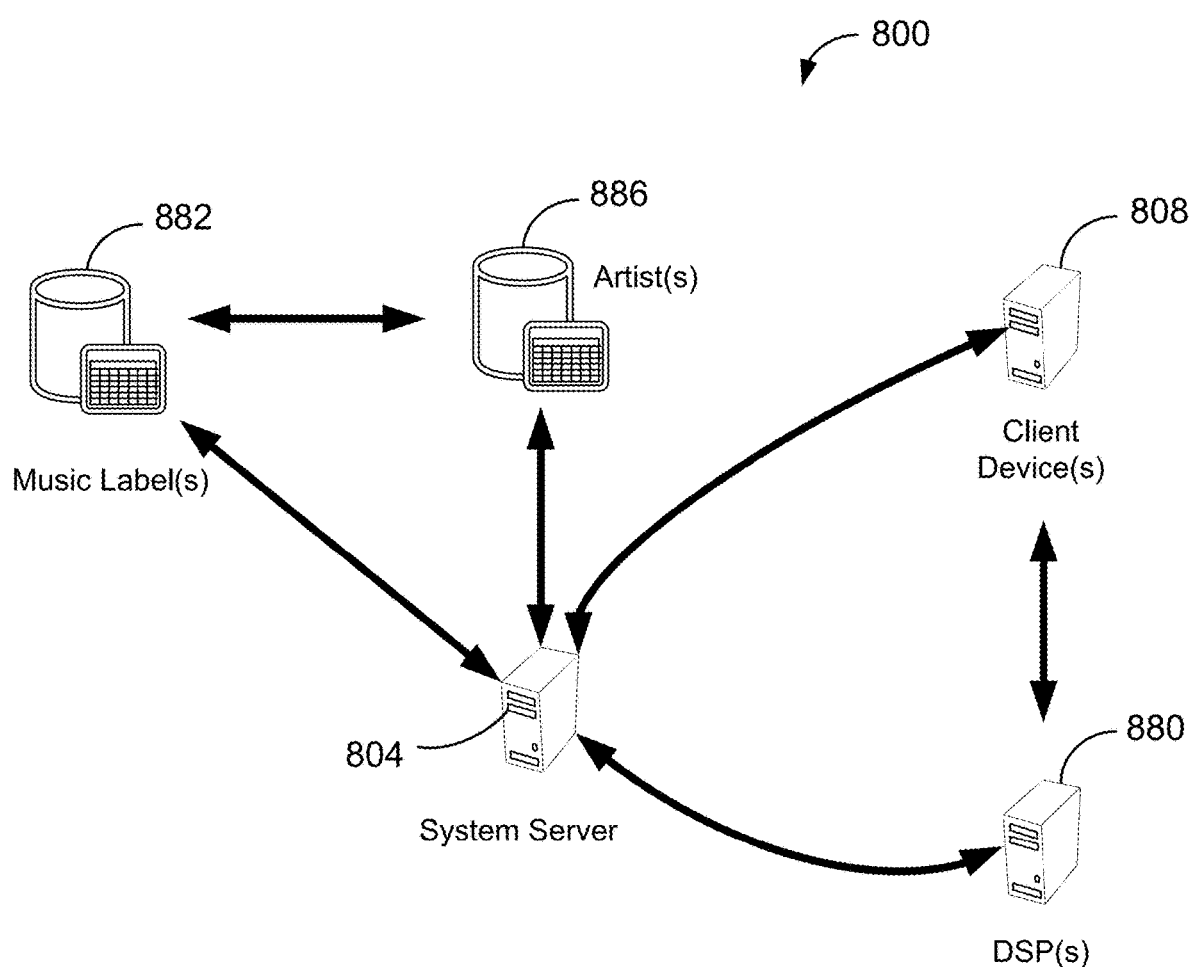
FIG. 8 shows a system diagram of an example of a system for tracking media file playback, in accordance with embodiments of the present disclosure.

FIG. 8 shows a system diagram of an example of a system 800 for exchanging information within a network environment, in accordance with some implementations. System 800 includes a variety of different hardware and/or software components which are in communication with each other. In the non-limiting example of FIG. 8, system 800 includes at least one system server 804, at least one client device 808. In some embodiments, system 800 includes at least one digital service provider (DSP) 880. One example of a DSP is Spotify or iTunes. In some embodiments, system 800 also includes a music label 882, and/or at least one artist 886. In some embodiments, music label 882 represents and uploads music from artists 886, but sometimes, artists 886 do not have a record label and thus upload music directly to system server 804. Often times, client device 808 streams songs from DSP 880. System 800 allows for system server 804 to help keep track of what songs are being streamed at client 808 via DSP 880.

System server 804 may communicate with other components of system 800. This communication may be facilitated through a combination of networks and interfaces. System server 804 may handle and process data requests and data transfers from the client device 808 (for direct content delivery models) and DSP 880. Likewise, system server 804 may return a response to client device 808 after a data request has been processed. For example, System server 804 may retrieve data from one or more databases, such as music label 882 or artist 886. It may combine some or all of the data from different databases, and send the processed data to one or more client devices or DSPs.

A client device 808 and DSP 880 may be computing devices capable of communicating via one or more data networks with a server. Examples of client device 808 and DSP 880 include a desktop computer or portable electronic device such as a smartphone, a tablet, a laptop, a wearable device, an optical head-mounted display (OHMD) device, a smart watch, a separate server, etc. Client device 808 and DSP 880 include at least one browser in which applications may be deployed.

Music label 882 can be a database implemented in a relational or non-relational database management system. In some embodiments, this database can include the contents of one or more client-related databases within a network environment.

Artist 886 can be an individual artist not associated with a record/music label, or an artist that is associated, but has special needs not fulfilled by the music label. In some embodiments, communication with artists 886 can include edits, modifications, and/or tracked changes information related to songs, albums, or any other streaming media associated with the artist.

Figure 9:
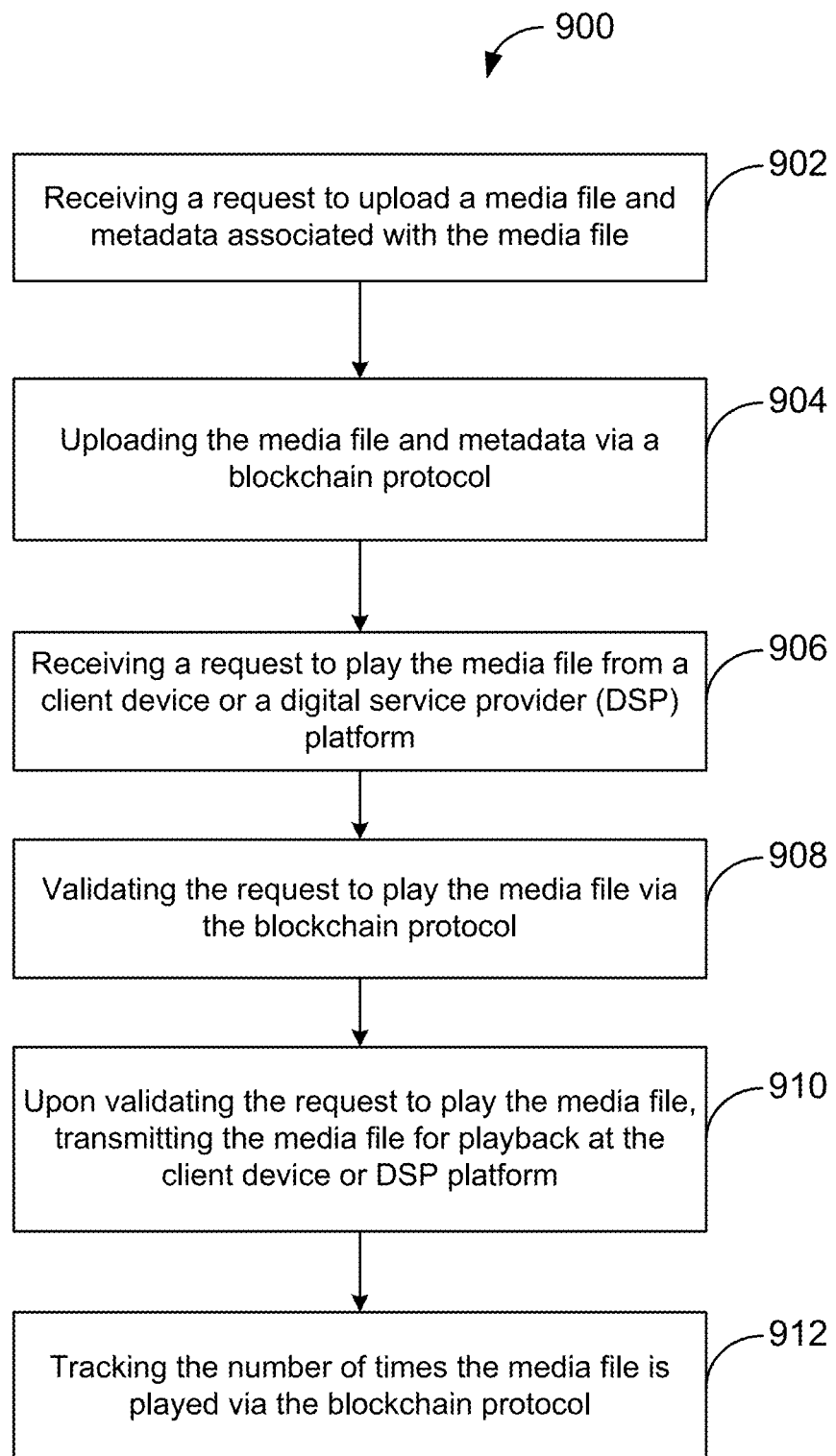
FIG. 9 shows a flowchart of a method for tracking media file playback, in accordance with embodiments of the present disclosure.

FIG. 9 shows a flowchart of a method 900 for tracking media file playback, in accordance with embodiments of the present disclosure. Method 900 for begins with receiving (902) a request to upload a media file and metadata associated with the media file. Next, the media file and metadata associated with the media file are uploaded (904) via a blockchain protocol. At 906, a request to play the media file from a client device or a digital service provider (DSP) platform is received. At 908, the request to play the media file is validated via the blockchain protocol. At 910, upon validating the request to play the media file, the media file is transmitted or streamed for playback at the client device or DSP platform. However, a small portion of the beginning of the media file could be streamed to the end user before the request has been validated in the interest of keeping latency low. Last, the number of times the media file is played up to a predetermined length is tracked (912) via the blockchain protocol.

In some embodiments, the blockchain protocol utilizes a proof of authority algorithm. In some embodiments, validating the request includes cryptographically validating the request by two authorized sealers from a plurality of sealers. In some embodiments, the request to play the media file includes a request to the blockchain to access the content at a specified time. In some embodiments, requests to the blockchain can be finalized as soon as they hit the blockchain thereby allowing appending to the blockchain in any order. In some embodiments, a short buffer of the media file is instantly streamed after receiving the request to play the media file, but the rest of the media file is only streamed after the request to play has been validated. In some embodiments, different versions of the blockchain client can be used for different clients assuming they follow the platform protocol rules.

Figure 10:
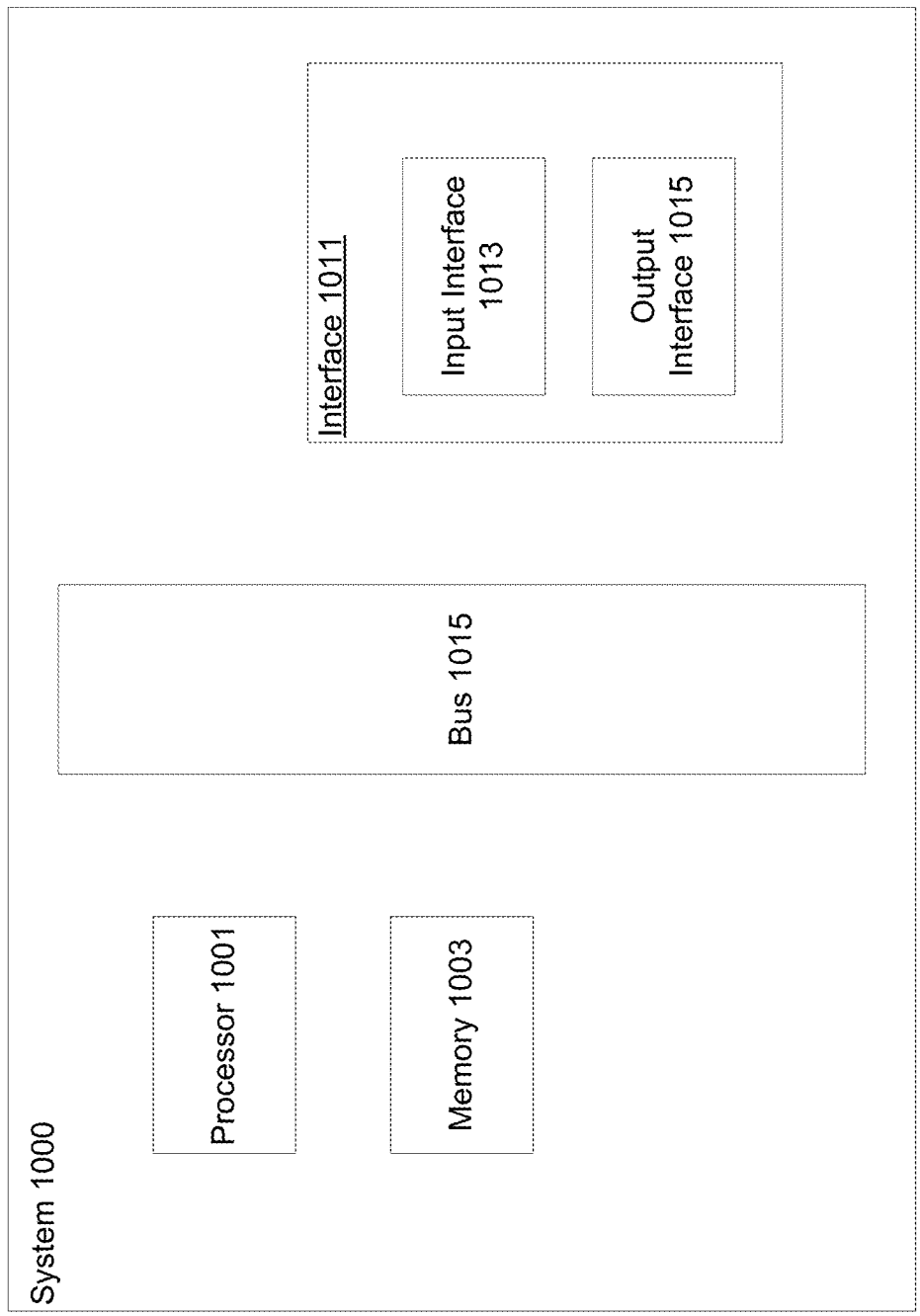
FIG. 10 shows one example of a computer system, in accordance with embodiments of the present disclosure.

Various computing devices can implement the methods described. For instance, a mobile device, computer system, etc. can be used for accessing aspects of the network environment by either the client, music label, or DSP. With reference to FIG. 10, shown is a particular example of a computer system that can be used to implement particular examples of the present disclosure. For instance, the computer system 1000 can be used to provide generate artificially rendered images according to various embodiments described above. In addition, the computer system 1000 shown can represent a computing system on a mobile device. According to particular example embodiments, a system 1000 suitable for implementing particular embodiments of the present disclosure includes a processor 1001, a memory 1003, an interface 1011, and a bus 1015 (e.g., a PCI bus). The interface 1011 may include separate input interface 1013 and output interface 1015, or may be a unified interface supporting both operations. When acting under the control of appropriate software or firmware, the processor 1001 is responsible for such tasks such as optimization. Various specially configured devices can also be used in place of a processor 1001 or in addition to processor 1001. The complete implementation can also be done in custom hardware. The interface 1011 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1000 uses memory 1003 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 11:
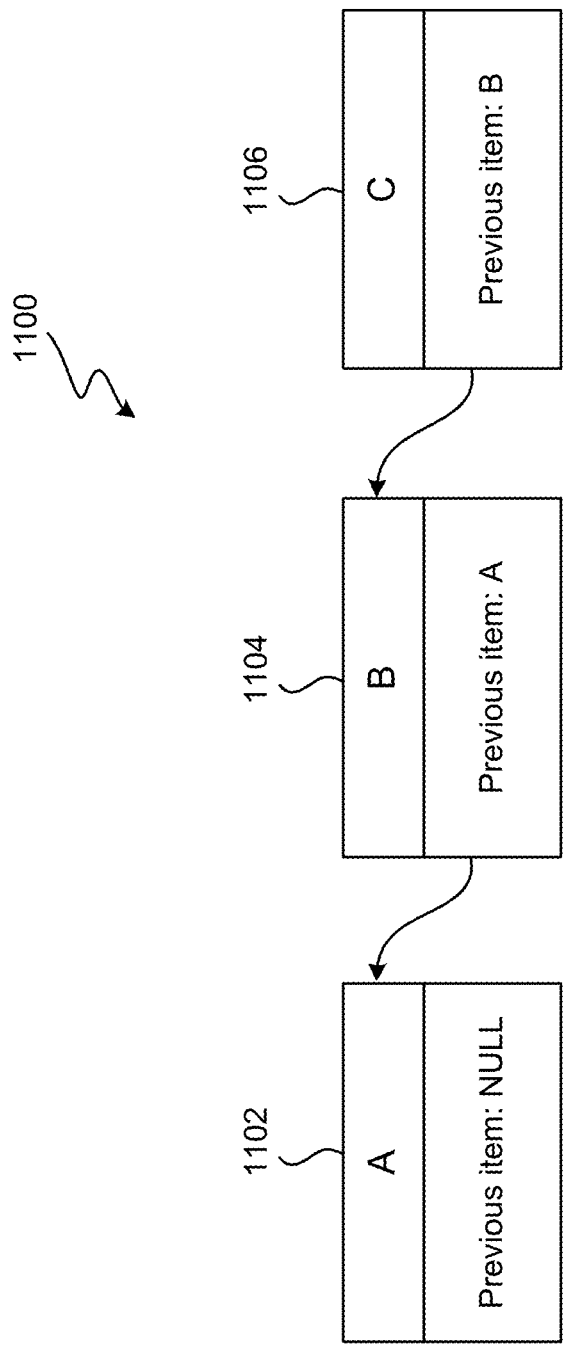
FIG. 11 shows one example of a linked list data structure, in accordance with embodiments of the present disclosure.

FIG. 11 shows a linked list data structure 1100 represented with three data segments 1102, 1104, and 1106. Conventional blockchains are structured similar to linked lists such that each segment of data refers to a previously created segment of data. For example, data segment 1106 contains a set of arbitrary data. In order for data segment 1106 to become a part of the entire data set, it contains a reference to the data segment that preceded it. In this case data segment 1104 comes before data segment 1106, therefore data segment 1106 contains a reference to data segment 1104. In some embodiments, the first entry into a linked list, FIG. 11 the data segment 1102, does not have a reference to any other data segments.

Figure 12:
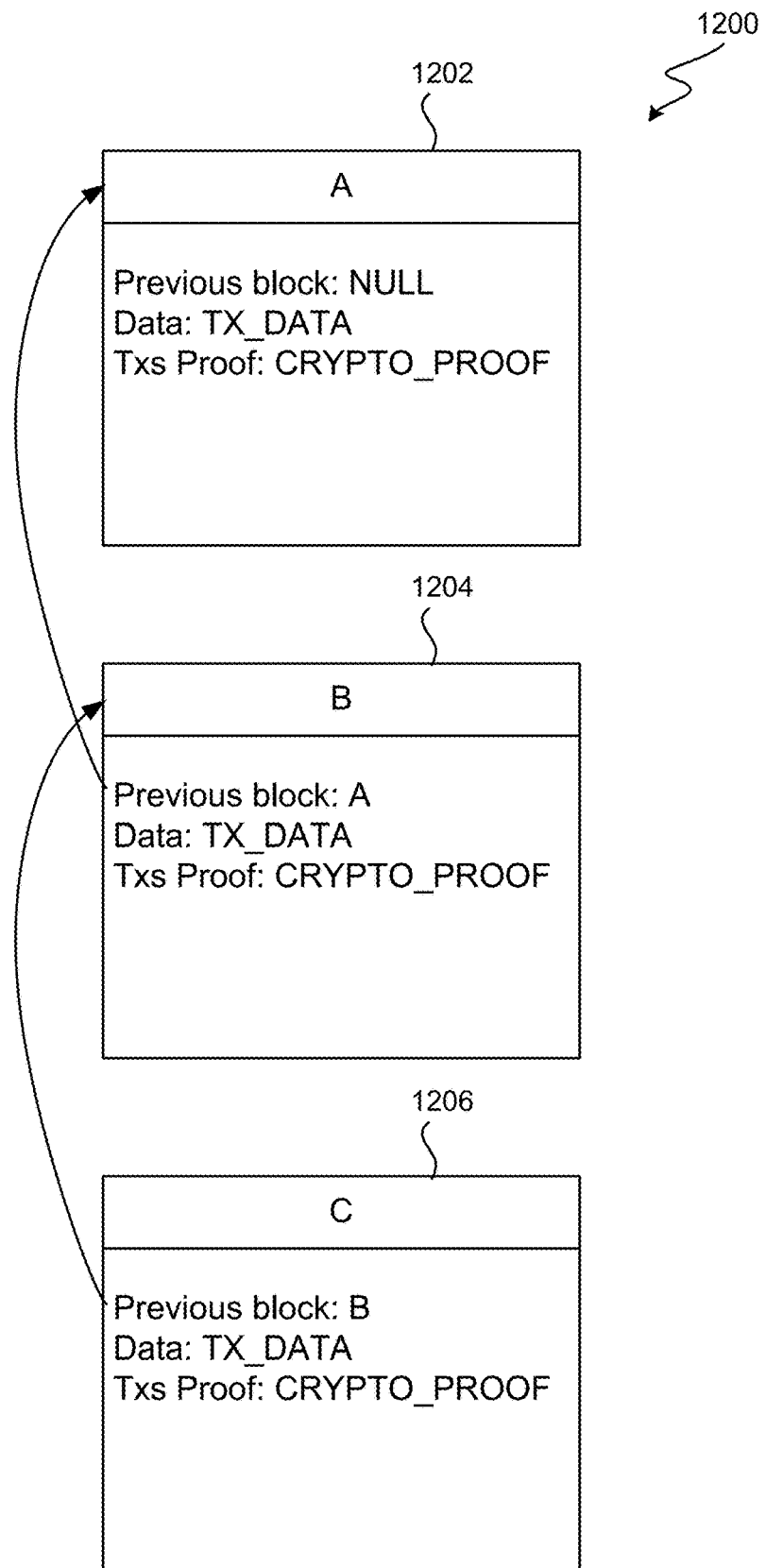
FIG. 12 shows a conceptual example of a blockchain, in accordance with embodiments of the present disclosure.

FIG. 12 shows a conceptual example of a blockchain 1200. Each block (1202, 1204, and 1206) contains a set of data within it. This data can be arbitrarily set, however, it is traditionally a list of transactions. In a similar spirit to the linked list in FIG. 11, each block has a reference to the block that preceded it. One distinguishing trait of blockchains as a data structure is that they contain cryptographic proofs that the data that they hold in each block has not been tampered with.

To ensure that historic data on the platform's network as a whole has not been tampered with, periodically segments of the data 1304 are aggregated and merklized 1306. This merkle root of the set of data is then written to a third-party blockchain 1302 that could be backed by any consensus algorithm such as Proof of Work or Proof of Stake. The motivation behind creating audit points that lie outside of the platform's blockchain 1308 is so any attacks performed on the platform's blockchain would be more expensive to undertake since the third party network 1302 would need to be attacked as well. For example, FIG. 13 shows an example of merkelizing of a portion of the platform's data set 1304. Given a set of data that is claimed to be from a specific segment of the platform's blockchain, the veracity can be concluded by merkelizing the set of data and ensuring it produces the same merkle root that exists on the third party blockchain 1302.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A system comprising:
   a processor; and
   memory, the memory storing instructions to cause a processor to execute a method, the method comprising:
   verifying a user for requesting play of media files;
   receiving a request to play a media file from the verified user;
   validating the request to play the media file via a blockchain protocol, wherein if the request to play the media file is not validated, then it is not considered a valid request to play the media file;
   upon validating the request to play the media file, transmitting the media file for playback; and
   incrementing a play count by one, wherein the play count corresponds to a number of times the media file has been transmitted for playback, wherein the number of times the media file is played up to a predetermined length is tracked via the block chain protocol, wherein the request to play the media file includes a request to access the blockchain.

2. The system of claim 1, wherein the blockchain protocol utilizes a proof of authority algorithm.

3. The system of claim 1, wherein validating the request includes cryptographically validating the request by two authorized sealers from a plurality of sealers.

4. The system of claim 1, wherein the request to play the media file includes a request to the blockchain to access the content at a specified time.

5. The system of claim 1, wherein requests to the blockchain can be finalized as soon as they hit the blockchain thereby allowing appending to the blockchain in any order.

6. The system of claim 1, wherein a short buffer of the media file is instantly streamed after receiving the request to play the media file, but the rest of the media file is only streamed after the request to play has been validated.

7. The system of claim 1, wherein different versions of the blockchain client are created for different clients.

8. A method comprising:
   verifying a user for requesting play of media files;
   receiving a request to play a media file from the verified user;
   validating the request to play the media file via a blockchain protocol, wherein if the request to play the media file is not validated, then it is not considered a valid request to play the media file;
   upon validating the request to play the media file, transmitting the media file for playback; and
   incrementing a play count by one, wherein the play count corresponds to a number of times the media file has been transmitted for playback, wherein the number of times the media file is played up to a predetermined length is tracked via the block chain protocol, wherein the request to play the media file includes a request to access the blockchain.

9. The method of claim 8, wherein the blockchain protocol utilizes a proof of authority algorithm.

10. The method of claim 8, wherein validating the request includes cryptographically validating the request by two authorized sealers from a plurality of sealers.

11. The method of claim 8, wherein the request to play the media file includes a request to the blockchain to access the content at a specified time.

12. The method of claim 8, wherein requests to the blockchain can be finalized as soon as they hit the blockchain thereby allowing appending to the blockchain in any order.

13. The method of claim 8, wherein a short buffer of the media file is instantly streamed after receiving the request to play the media file, but the rest of the media file is only streamed after the request to play has been validated.

14. The method of claim 8, wherein different versions of the blockchain client are created for different clients.

15. A non-transitory computer readable medium storing instructions to execute a method, the method comprising:
   verifying a user for requesting play of media files;
   receiving a request to play a media file from the verified user;
   validating the request to play the media file via a blockchain protocol, wherein if the request to play the media file is not validated, then it is not considered a valid request to play the media file;
   upon validating the request to play the media file, transmitting the media file for playback; and
   incrementing a play count by one, wherein the play count corresponds to a number of times the media file has been transmitted for playback, wherein the number of times the media file is played up to a predetermined length is tracked via the block chain protocol, wherein the request to play the media file includes a request to access the blockchain.

16. The non-transitory computer readable medium of claim 15, wherein the blockchain protocol utilizes a proof of authority algorithm.

17. The non-transitory computer readable medium of claim 15, wherein validating the request includes cryptographically validating the request by two authorized sealers from a plurality of sealers.

18. The non-transitory computer readable medium of claim 15, wherein the request to play the media file includes a request to the blockchain to access the content at a specified time.

19. The non-transitory computer readable medium of claim 15, wherein requests to the blockchain can be finalized as soon as they hit the blockchain thereby allowing appending to the blockchain in any order.

20. The non-transitory computer readable medium of claim 15, wherein a short buffer of the media file is instantly streamed after receiving the request to play the media file, but the rest of the media file is only streamed after the request to play has been validated.

\* \* \* \* \*